(12) United States Patent
Mavani (10) Patent No.: US 11,321,128 B2
(45) Date of Patent: May 3, 2022

(54) SYSTEM FOR RESOURCE ALLOCATION VIA AN INTERMEDIATE RESOURCE VOLUME ADJUSTMENT SUB-SYSTEM

(71) Applicant: BANK OF AMERICA CORPORATION, Charlotte, NC (US)

(72) Inventor: Saurabh Mavani, Lake Hopatcong, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 368 days.

(21) Appl. No.: 16/737,652

(22) Filed: Jan. 8, 2020

(65) Prior Publication Data

US 2021/0208936 A1    Jul. 8, 2021

(51) Int. Cl.
*G06F 9/50* (2006.01)
*G06F 9/54* (2006.01)
*G06F 11/30* (2006.01)

(52) U.S. Cl.
CPC ............ *G06F 9/5011* (2013.01); *G06F 9/542* (2013.01); *G06F 9/546* (2013.01); *G06F 11/3006* (2013.01); *G06F 11/3034* (2013.01); *G06F 2209/508* (2013.01)

(58) Field of Classification Search
CPC ..................................................... G06F 9/5011
See application file for complete search history.

(56) References Cited

U.S. PATENT DOCUMENTS

| | | | |
|---|---|---|---|
| 5,889,939 A * | 3/1999 | Iida | G06F 11/3485 714/48 |
| 7,606,731 B2 | 10/2009 | McClung, III | |
| 8,006,900 B2 | 8/2011 | Grigsby et al. | |
| 8,892,468 B1 | 11/2014 | Litle | |
| 10,032,185 B2 | 7/2018 | Watfa et al. | |
| 2009/0299887 A1 | 12/2009 | Shiran et al. | |
| 2016/0104188 A1 | 4/2016 | Glyman et al. | |
| 2018/0276042 A1 * | 9/2018 | Toal | G06F 11/3037 |

* cited by examiner

*Primary Examiner* — Charlie Sun
(74) *Attorney, Agent, or Firm* — Moore & Van Allen PLLC; James C. Edwards (57) ABSTRACT

Embodiments of the present invention provide an end-to-end automated process for resource allocation as a result of monitoring resource volumes required to transmit an object and determining a difference between the an object's resource volume used in a resource interaction and the current object's resource volume required to transmit the object. As a result, the present invention provides the capability to perform resource allocation absent any input or other actions on behalf of the entity to whom the resources are being allocated.

20 Claims, 8 Drawing Sheets

SYSTEM FOR RESOURCE ALLOCATION VIA AN INTERMEDIATE RESOURCE VOLUME ADJUSTMENT SUB-SYSTEM

FIELD

The present invention relates to resource allocation and, more specifically, the present invention provides for resource allocation as a result of determining, post-resource interaction, a difference between the resource volume used in the resource interaction for transmitting an object and the current resource volume required to transmit the object.

BACKGROUND

Presently resource allocation requires a user to perform actions as a means of initiating the resource allocation process (i.e., monitoring resource volumes for a previously transmitted object). A need exists for an end-to-end automated process wherein resources can be allocated in the event a difference is determined between an object's resource volume used in a resource interaction and the current object's resource volume required to transmit the object, absent any input or other actions on behalf of the user.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for an end-to-end automated process for resource allocation as a result of monitoring resource volumes required to transmit an object and determining a difference between the an object's resource volume used in a resource interaction and the current object's resource volume required to transmit the object. As a result, the present invention provides the capability to perform resource allocation absent any input or other actions on behalf of the entity to whom the resources are being allocated.

A system for resource allocation defines first embodiments of the system. The system includes a resource interaction sub-system that includes a first memory and one or more first computing processors in communication with the first memory. The first memory stores first instructions that are executable by the one or more first computing processors. The first instructions are configured to process a resource interaction between an object recipient and an object provider. The resource interaction is performed using a resource vehicle associated with a resource depository held by the object recipient at a resource entity. Further, the resource interaction includes exchange of an object, provided by the object-provider for a first resource volume, provided by the object-recipient from the resource depository.

The system further includes a resource volume adjustment sub-system that includes a second memory and one or more second processors in communication with the second memory. The second memory stores second instructions that are executable by the one or more second processors. The second instructions are configured to identify the object in the resource interaction as being subject to a resource volume adjustment based on a predetermined relationship between the object provider and the resource entity. Further, the second instructions are configured to, in response to identifying the object, monitor, for a first predetermined time period, a second resource volume required by the object provider to transmit the object and, as a result of the monitoring, determine that the second resource volume is less than the first resource volume. In addition, the second instructions are configured to, in response to the determining, allocate resources to the resource depository in a volume associated with a difference between the second resource volume and the first resource volume. According to specific embodiments of the system, the volume allocated may be equal to, less than or greater than the difference between the second resource volume and the first resource volume.

In specific embodiments of the system, the entire allocating of resource process occurs absent input from the object recipient.

In other alternative embodiments the system includes a resource interaction database associated with the object provider and configured to store data associated with resource interactions performed between the object providers and a plurality of object recipients. In such embodiments of the system, the second instructions are further configured to monitor the second resource volume by accessing the resource interaction database to determine the second resource volume from resource interactions occurring within the first predetermined time period.

In other alternative embodiments the system includes an object exchange database associated with the object provider and configured to store current resource volume information required for transmitting objects provider by the object provider. In such embodiments of the system, the second instructions are further configured to monitor the second resource volume by accessing the object exchange database to determine the second resource volume based on the current resource volume required for transmitting the object.

In other embodiments of the system, the second instructions are further configured to monitor, for a second predetermined period of time, a third resource volume required by one or more other object providers to transmit the object, and, as a result of the monitoring, determine that either the second resource volume or the third resource volume is less than the first resource volume. Additionally, the second instructions are configured to, in response to determining, allocate resources to the resource depository in a volume associated with a difference between the second resource volume or the third resource volume and the first resource volume.

In still further specific embodiments of the system, the second instructions are further configured to determine that the difference between the second resource volume and the first resource volume exceeds a predetermined threshold volume or percentage prior to allocating the resources.

In other specific embodiments of the system, the resources allocated are provided by object provider or a combination of the object provider and the resource entity.

A computer program product for resource allocation defines second embodiments of the invention. The computer program product includes at least one non-transitory computer readable medium that includes computer readable instructions. The computer readable instructions are configured for processing a resource interaction between an object recipient and an object provide. The resource interaction is performed using a resource vehicle associated with a resource depository held by the object recipient at a resource entity. Further, the resource interaction includes exchange of an object, provided by the object-provider, for a first resource volume, provided by the object recipient from the resource depository. The computer readable instructions are further configured for identifying the object in the resource interaction as being subject to a resource volume adjustment based on a predetermined relationship between the object provider and the resource entity. In response to identifying the object, the computer readable instructions are further configured for, in response to identifying the object, monitoring, for a first predetermined time period, a second resource volume required by the object provider to transmit the object, and, as a result of the monitoring, determining that the second resource volume is less than the first resource volume. Further, the computer readable instructions are configured for, in response to determining, allocating resources to the resource depository in a volume associated with a difference between the second resource volume and the first resource volume. According to specific embodiments of the computer program product, the volume allocated may be equal to, less than or greater than the difference between the second resource volume and the first resource volume.

In specific embodiments of the computer program product, the computer readable instructions for monitoring further comprise computer readable instructions for monitoring the second resource volume by accessing a resource interaction database to determine the second resource volume from resource interactions occurring within the first predetermined time period. In other related embodiments of the computer program product, the computer readable instructions for monitoring further comprises computer readable instructions for monitoring the second resource volume by accessing an object exchange database to determine the second resource volume based on the current resource volume required for transmitting the object.

A computer-implemented method for resource allocation defines third embodiments of the invention. The method is executed by one or more computing processor devices. The method includes processing a resource interaction between an object recipient and an object provider. The resource interaction is performed using a resource vehicle associated with a resource depository held by the object recipient at a resource entity. The resource interaction includes exchange of an object for a first resource volume. The method further includes identifying the object in the resource interaction as being subject to a resource volume adjustment based on a predetermined relationship between the object provider and the resource entity. Further, the method includes, in response to identifying the object, monitoring, for a first predetermined time period, a second resource volume required by the object provider to transmit the object, and, as a result of the monitoring, determining that the second resource volume is less than the first resource volume. In addition, the method includes in response to determining, allocating resources to the resource depository in a volume associated with a difference between the second resource volume and the first resource volume. According to specific embodiments of the computer-implemented method, the volume allocated may be equal to, less than or greater than the difference between the second resource volume and the first resource volume.

In specific embodiments of the computer-implemented method, monitoring further includes monitoring the second resource volume by accessing a resource interaction database to determine the second resource volume from resource interactions occurring within the first predetermined time period. In related embodiments of the computer-implemented method, the monitoring further includes monitoring the second resource volume by accessing an object exchange database to determine the second resource volume based on the current resource volume required for transmitting the object.

Thus, according to embodiments of the invention, which will be discussed in greater detail below, the present invention provides for multi-dimensional modeling of resource interaction processors for determining viability of deployment of resource interaction services. The system leverages data captured from various sources along with internal and external rules and regulations applicable to a resource interaction processor to determine whether the resource interaction processor meets requirements for resource interactions services. In the event that the resource interaction processor is determined to be viable, resource interactions services are deployed to the resource interaction processor.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer-implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for an end-to-end automated process for resource allocation as a result of monitoring resource volumes required to transmit an object and determining a difference between the an object's resource volume used in a resource interaction and the current object's resource volume required to transmit the object. As a result, the present invention provides the capability to perform resource allocation absent any input or other actions on behalf of the entity to whom the resources are being allocated.

In specific embodiments of the invention, resource allocation includes automatic refunding to a customer/user payment account as a result of monitoring the current price of an item/service (i) previously purchased and (ii) identified as subject to price protection and determining that the current price of the item/service is less than the purchase price of the item/service. The invention automatically identifies items/services subject to price adjustment/protection and, as such the customer/user is not required to register the item/service or otherwise initiate the price protection process. Moreover, monitoring of the current price may be accomplished by providing for direct access to a merchant's transaction database, such that a determination can be made as whether the merchant sold the item/service for an amount less than the purchase price. In addition, monitoring of the current price may be accomplished by providing for direct access to a merchant's pricing database, such that a determination can be made as to whether the merchant has lowered the price on the item/service after the customer/user has purchased the item/service. In specific embodiments of the invention the price protection is afforded to the merchant at which the item/service was purchased, while in other embodiments of the invention the price protection is additionally afforded to other merchant(s) (e.g., competitors of the merchant at which the item/service was purchased).

Figure 1:
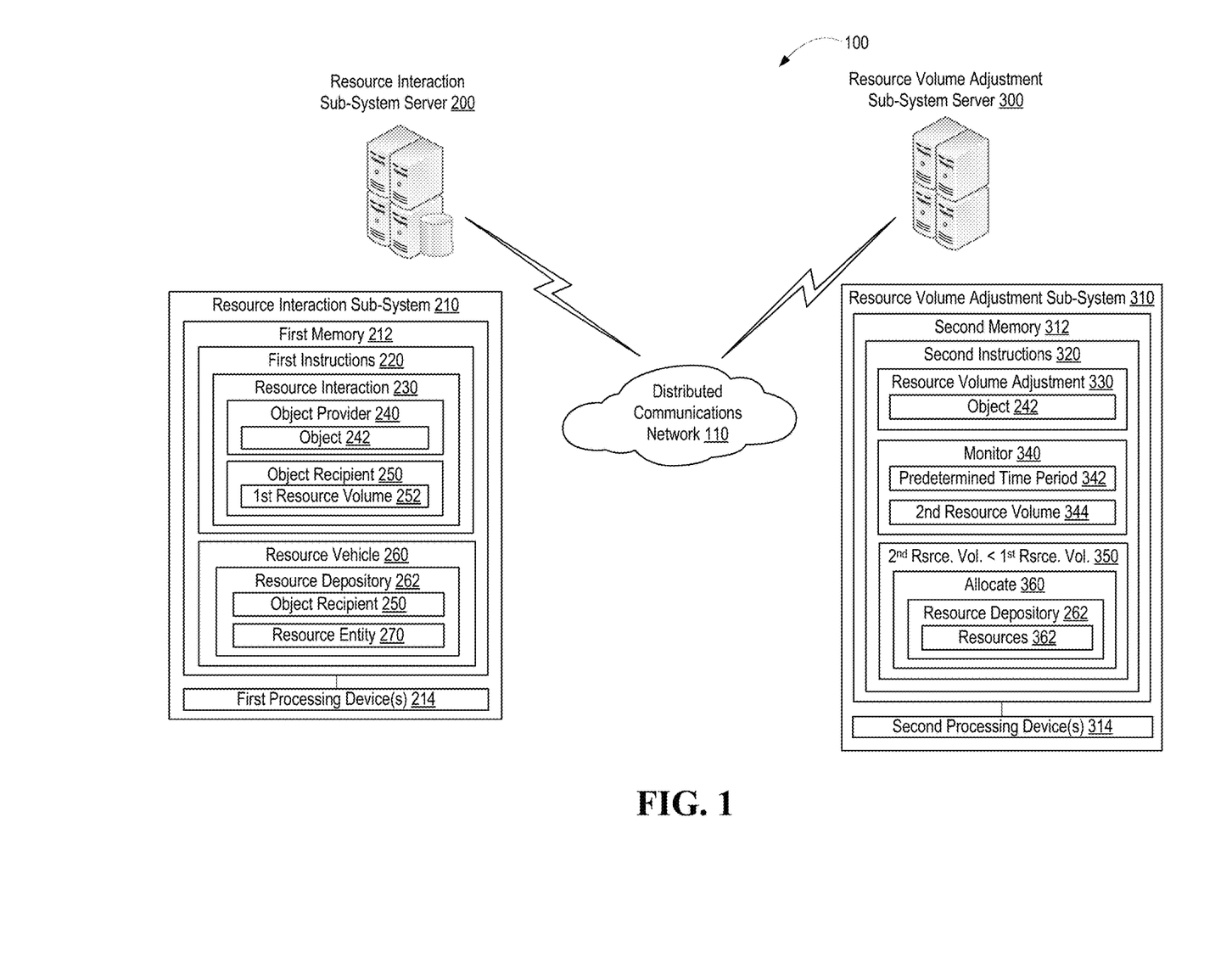
FIG. 1 is a schematic diagram of a system for resource allocation, in accordance with embodiments of the present invention.

Referring to FIG. 1, a schematic diagram is depicted of a system 100 for resource allocation, in accordance with embodiments of the present invention. The system 100 is capable allocating resources (i.e., providing resource volume adjustment for a previously acquired object) absent any input or other actions by or on behalf of the object recipient. The system 100 is implemented in a distributed communications network 110, which may include the Internet and one or more intranets or the like. The system 100 includes a resource interaction sub-system 210 that is implemented via resource interaction sub-system application server(s) 200 or other computing device(s). Resource interaction sub-system 210 includes first memory 212 and one or more first processing devices 214 in communication with the first memory 212. First memory 212 stores first instructions 220 that are executable by the first processing device(s) 214. First instructions 220 are configured to process and store information associated with a resource interaction 230 conducted between a resource provider 240 and a resource recipient 250. The resource interaction 230 is conducted using a resource vehicle 260 that is associated with a resource depository 262 held by the object recipient 250 at a resource entity 270. Further, the resource interaction 230 includes exchange of an object 242, provided by the object provider 240, for a first resource volume 252, provided by the object recipient 250.

System 100 additionally includes resource volume adjustment sub-system 310 that is implemented via resource volume adjustment sub-system application server(s) 300 or other computing device(s). Resource volume adjustment sub-system 310 includes second memory 312 and one or more second processing devices 314 in communication with second memory 312. Second memory 312 stores second instructions 320 that are executable by the second processing device(s) 314. Second instructions 220 are configured to identify the object 242 in the resource interaction 230 as being subject to a possible resource volume adjustment 330 based on a predetermined relationship between the object provider 240 and the resource entity 270. Identification may include accessing the stored information associated with the resource interaction 230, which includes, but is not limited to, the object providers, a date of the resource interaction, an object identifier and the first resource volume 252 used to acquire the object 242 and comparing the object identifier and/or object provider to a listing of object providers and associated objects subject to volume adjustment.

Second instructions 320 are further configured to, in response to identifying the object 242 as being subject to resource volume adjustment 330, monitor 340, for a predetermined time period 342, a second resource volume 344 required by the object provider 240 to transmit the object 242. As a result of the monitoring, second instructions 320 are configured to determine 350 that the second resource volume 344 is less than the first resource volume 252 (i.e., the current resource volume required by the object provider 240 to transmit the object 242 is less than the resource volume used in the resource interaction). In response to making such a determination, second instructions 320 are configured to allocate 360 resources 362 to the resource depository 262 in a volume that is associated with (e.g., equal to, less than or greater than) the difference between the second resource volume 344 and the first resource volume 252. As previously noted, the identification of the object, the monitoring of the second resource volume and the allocation of resources to the resource depository occurs absent any input or other actions by or on behalf of the object recipient 250.

Figure 2:
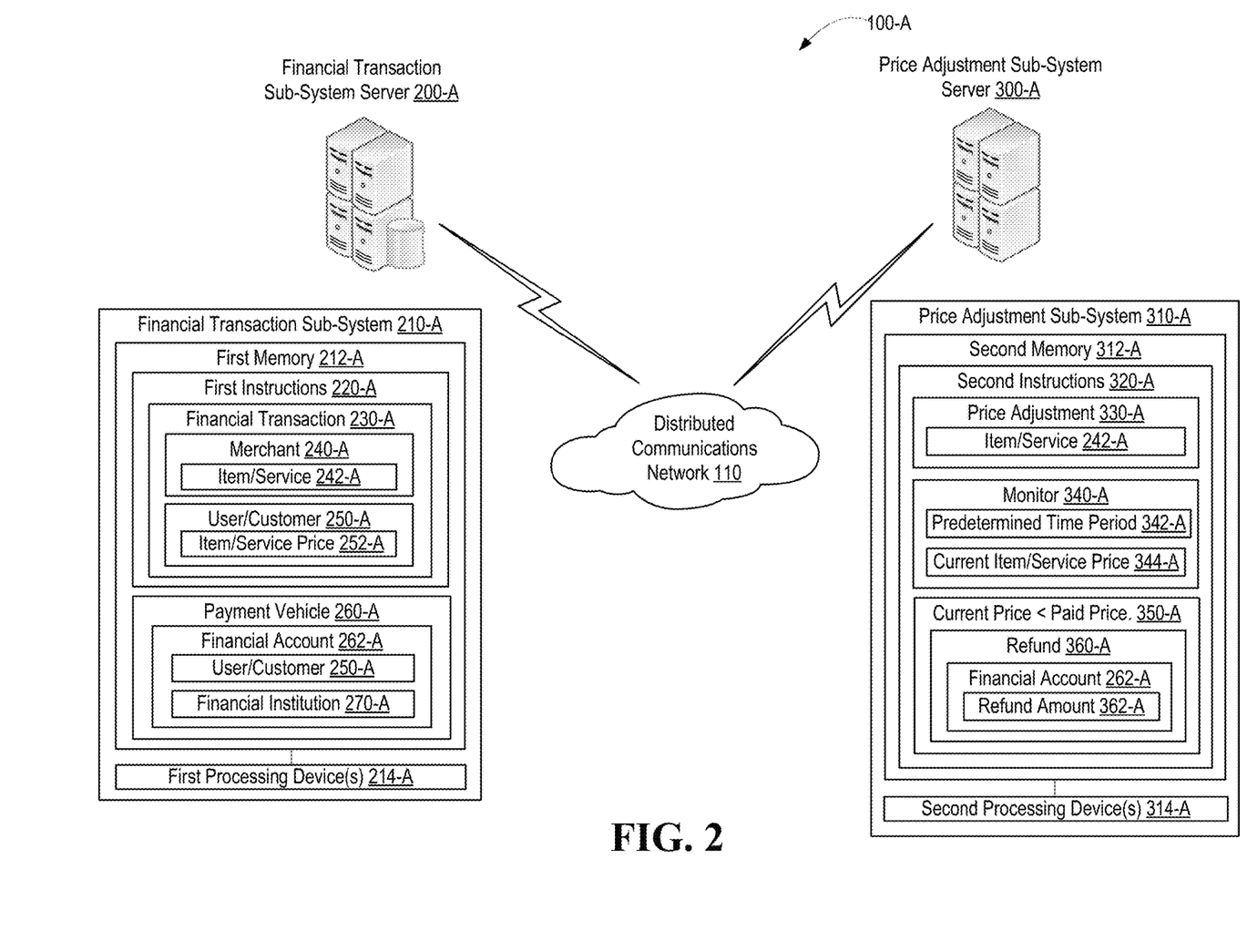
FIG. 2 is a schematic diagram of a system for resource allocation; specifically, price adjustment/protection of a previously purchased item/service, in accordance with some embodiments of the present disclosure.

Referring to FIG. 2 a schematic diagram is depicted of a system 100-A for resource allocation, specifically, automated price protection, in accordance with specific embodiments of the present invention. The system 100-A is capable providing automatic price adjustments/refunds (i.e., price protections) in the event that a merchant offers and/or sells the a previously purchased item/service for a lower price absent any input or other actions by or on behalf of the user/customer. Similar to the system 100 described in relation to FIG. 1, system 100-A is implemented in a distributed communications network 110, which may include the Internet and one or more intranets or the like. The system 100 includes a financial transaction sub-system 210-A that is implemented via financial transaction sub-system application server(s) 200-A or other computing device(s). Financial transaction sub-system 210-A includes first memory 212-A and one or more first processing devices 214-A in communication with the first memory 212-A. First memory 212-A stores first instructions 220-A that are executable by the first processing device(s) 214-A. First instructions 220-A are configured to process and store information associated with a financial transactions 230-A conducted between a merchant 240-A or the like and a user/customer 250-A. The financial transaction 230-A is conducted using a payment vehicle 260-A (e.g., credit card, debit card, or the like) that is associated with a financial account 262-A held by the user/customer 250-A at a financial institution 270-A. Further, the financial transaction 230-A includes exchange of an item and/or service 242-A, provided by the merchant 240-A, for an item/service price 252-A, provided by the user/customer 250-A.

System 100-A additionally includes price adjustment sub-system 310-A that is implemented via price adjustment sub-system application server(s) 300-A or other computing device(s). Price adjustment sub-system 310-A includes second memory 312-A and one or more second processing devices 314-A in communication with second memory 312-A. Second memory 312-A stores second instructions 320-A that are executable by the second processing device(s) 314-A. Second instructions 220-A are configured to identify the item/service 242-A in the financial transaction 230-A as being subject to a possible price adjustment 330-A based on a predetermined relationship between the merchant 240-A and the financial institution 270-A. Identification may include accessing the stored information associated with the financial transaction 230-A, which includes, but is not limited to, the merchant, a date of the transaction, an item/service identifier (e.g., SKU (stock keeping unit) or the like) and the price paid for the item/service 252-A and comparing the item/service identifier and/or merchant to a listing of merchants and associated item/services subject to price adjustments/protection.

Second instructions 320-A are further configured to, in response to identifying the item/service 242-A as being subject to price adjustment/protection 330-A, monitor 340-A, for a predetermined time period 342-A, the current price 344-A required by the merchant 240-A for purchasing the item/service 242-A. The predetermined time period 342-A (e.g., a week, a month, 60 days, 90 days or the like) may vary according to the predetermined relationship between the merchant 240-A and the financial institution 270-A. As a result of the monitoring, second instructions 320-A are configured to determine 350-A that the current price 344-A is less than the purchased/paid price 252-A. In response to making such a determination, second instructions 320-A are configured to refund 360-A the financial account 262-A in an amount 362-A that is associated with (e.g., equal to, less than or greater than) the difference between the current price 344-A and the paid/purchase price 252-A. As previously noted, the identification of the item/service, the monitoring of the current price and the refunding to the financial account occurs absent any input or other actions by or on behalf of the user/customer 250-A.

Figure 3:
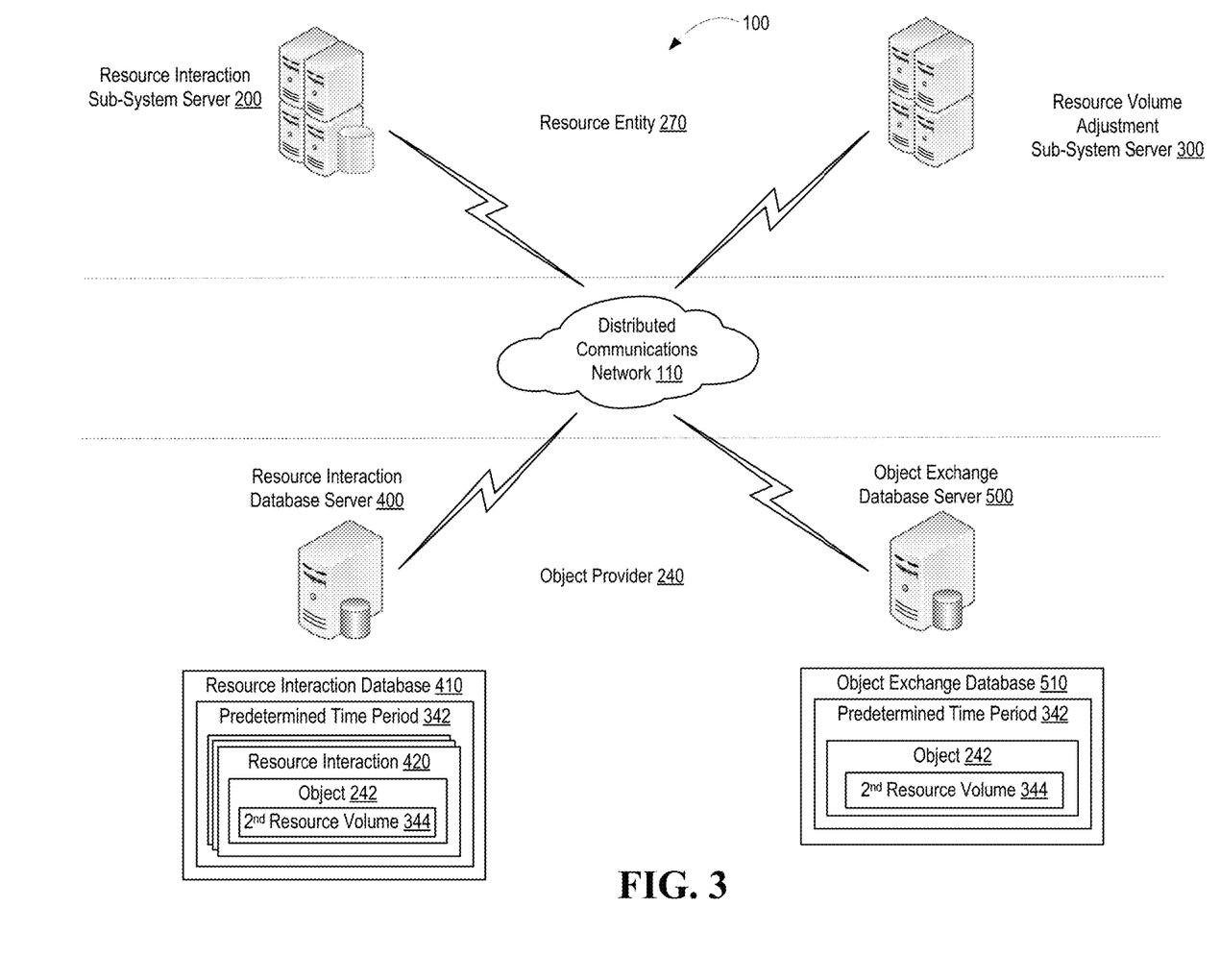
FIG. 3 is a schematic diagram of a system for resource allocation highlighting different means for monitoring the second resource volume, in accordance with some embodiments of the present disclosure.

Referring to FIG. 3 a schematic diagram is presented of a system 100 for resource allocation highlighting different means for monitoring the second resource volume, in accordance with embodiments of the present invention. The system 100 of FIG. 3 includes the resource interaction sub-system application server(s) 200 and the resource volume adjustment sub-system application servers 300 show and discussed in relation to FIG. 1. In addition, the system 100 includes resource interaction database server(s) 400 and/or object exchange database server(s) 500. In specific embodiments of the system 100, the resource volume adjustment process and, specifically, the monitoring of the second resource volume is performed by the resource entity 270 or a third-party entity at the bequest of the resource entity 270. In such embodiments of the invention, the resource volume adjustment application server(s) 300 are in network communication with an object provider 240-based resource interaction database server 410 for the purpose of monitoring, for a predetermined time period 342, the resource interaction database 410 for resource interactions 420 conducted by the object provider 240 that include the object 242. In this regard, the resource entity 270 is able to determine the second resource volume 344 from the resource interactions 420 conducted within the predetermined time period 342 that included the object 242. In such embodiments of the system, resource allocation may be predicated on the object provider 240 conducting a resource interaction 240 including the object 242 during the predetermined time period 342 for a resource volume that is less than the resource volume for exchanging the object 242 in the initial resource interaction 230.

In other embodiments of the system 100, the resource volume adjustment application server(s) 300 are in network communication with an object provider 240-based object exchange database server 500 for the purpose of monitoring, for a predetermined time period 342, object exchange database 510 for variances in the second resource volume 344 required by the object provider 240 to transmit the object 242. In this regard, the resource entity 270 is able to determine the second resource volume 344 from the object provider's current listing of resource volume required to transmit the object 242.

In other embodiments of the system, the monitoring of the second resource volume 344 may be performed by having the object provider 240 communicate resource volume updates/changes to the resource volume adjustment system 310 or having the resource volume adjustment sub-system 310 monitor third-party websites or the like for postings of updates/changes to the second resource volume. In still further embodiments of the system, in which the overall resource volume adjustment process or at least the monitoring is performed by the object provider 240, the object provider 240 may monitor internal resource interaction databases (e.g., resource interaction database 410) and object exchange databases (e.g., object exchange database 510) for updates/changes to the second resource volume 344.

Figure 4:
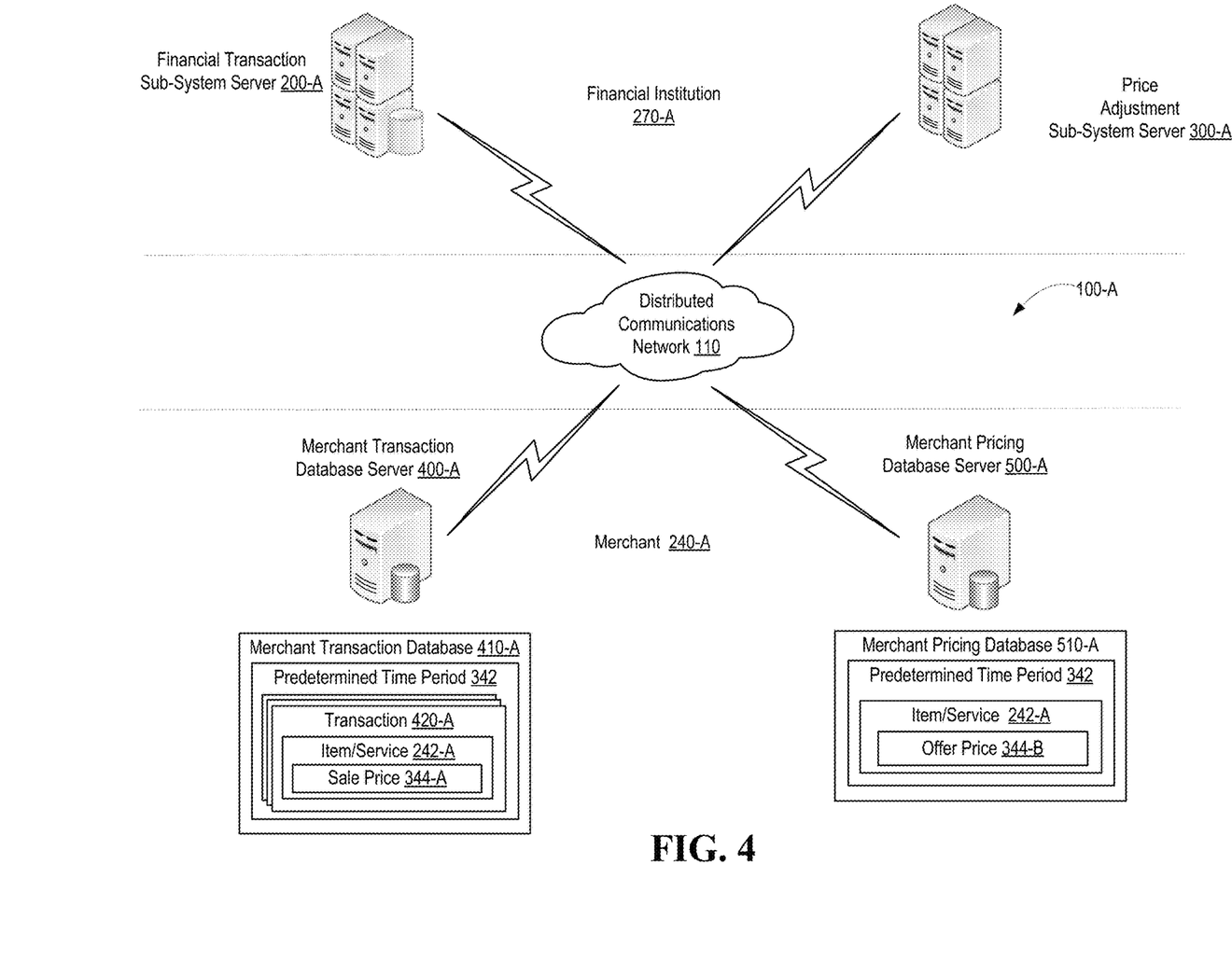
FIG. 4 is a schematic diagram of a system for resource allocation; specifically, price adjustment/protection of a previously purchased item/system highlighting different means for monitoring the current price of the item/service, in accordance with embodiment of the present invention.

Referring to FIG. 4 a schematic diagram is presented of a system 100-A for price adjustment/protection highlighting different means for monitoring the current price of an item/service, in accordance with specific embodiments of the present invention. The system 100-A of FIG. 4 includes the financial transaction sub-system application server(s) 200-A and the price adjustment sub-system application servers 300-A show and discussed in relation to FIG. 2. In addition, the system 100-A includes merchant transaction database server(s) 400-A and/or merchant pricing database server(s) 500-A. In specific embodiments of the system 100-A, the price adjustment/protection process and, specifically, the monitoring of the merchant's current price is performed by the financial institution 270-A or a third-party entity at the bequest of the financial institution 270-A. In such embodiments of the invention, the resource volume adjustment application server(s) 300-A are in network communication with an merchant transaction database server 410-A for the purpose of monitoring, for a predetermined time period 342, the merchant transaction database 410-A for transactions 420-A conducted by the merchant 240-A that include the item/service 242-A. In this regard, the financial institution 270-A is able to determine the current price 344-A from the merchant transactions 420-A conducted within the predetermined time period 342 that included the item/service 242-A. In such embodiments of the system 100-A, price adjustment/protection may be predicated on the merchant 240-A conducting a transaction 420-A including the item/service 242-A during the predetermined time period 342 for an amount/price that is less than the amount/price for item/service 242-A in the initial financial transaction 230-A.

In other embodiments of the system 100-A, the price adjustment application server(s) 300-A are in network communication with an merchant pricing database server 500-A for the purpose of monitoring, for a predetermined time period 342, pricing database 510-A for variances in the offer price 344-B required by the merchant 240-A to acquire object/service 242-A. In this regard, the financial institution 270-A is able to determine the current price 344-B from the merchant's current listing of prices for the object 242-A.

In other embodiments of the system, the monitoring of the current price 344-A may be performed by having the merchant 240-A communicate pricing updates/changes to the price adjustment system 310-A or having the price adjustment sub-system 310 monitor third-party websites or the like for advertisements or the like listing updates/changes to the current price 344-A of the object. In still further embodiments of the system, in which the overall pricing adjustment process or at least the monitoring is performed by the merchant 240-A, the merchant 240-A may monitor internal transaction databases (e.g., merchant transaction database 410-A) and merchant pricing databases (e.g., merchant pricing database 510-A) for transactions including the item/service and the sale price 344-A and/or updates/changes to the current price 344-B.

Figure 5:
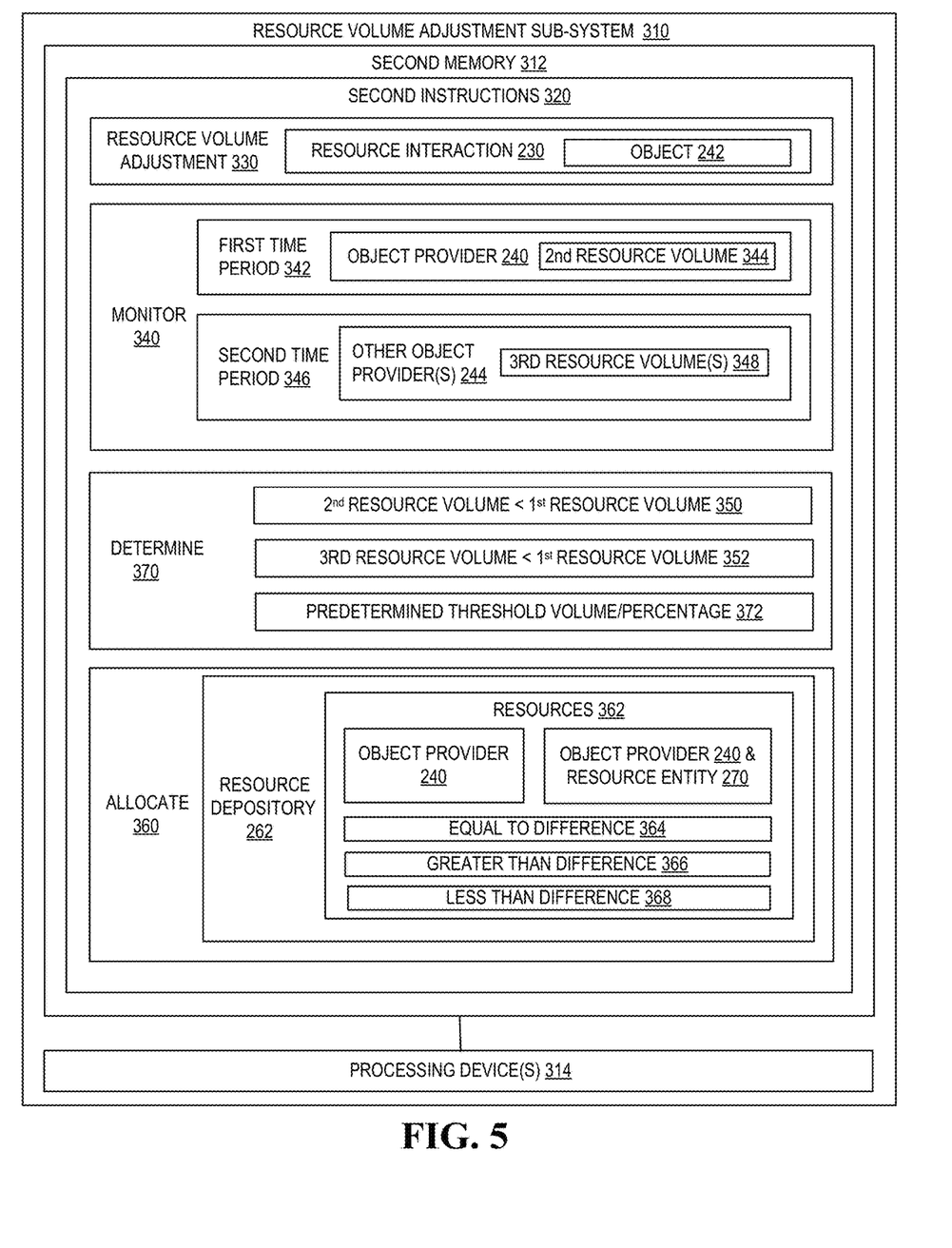
FIG. 5 is a block diagram of a resource volume adjustment sub-system, in accordance with embodiments of the present invention.

FIG. 5 depicts a block diagram of a resource volume adjustment sub-system 310, in accordance with various embodiments of the present invention. The resource volume adjustment sub-system 310 may comprise one or typically more computing devices (e.g., servers, computing devices, or the like) and is configured to execute instructions, such as such as second instruction 320, algorithms, modules, routines, applications and the like. resource volume adjustment sub-system 310 includes second memory 312 which may comprise volatile and non-volatile memory, such as read-only and/or random-access memory (RAM and ROM), EPROM, EEPROM, flash cards, or any memory common to computing platforms). Moreover, second memory 312 may comprise cloud storage, such as provided by a cloud storage service and/or a cloud connection service.

Further, resource volume adjustment sub-system 310 also includes at least one second processing device 314 which may be an application-specific integrated circuit ("ASIC"), or other chipset, logic circuit, or other data processing device. Second processing devices 314 may execute one or more application programming interface (APIs) (not shown in FIG. 5) that interface with any resident programs, such as second instructions 320 or the like stored in the second memory 312 of the resource volume adjustment sub-system 310 and any external programs. Second processing devices 314, may include various processing subsystems (not shown in FIG. 5) embodied in hardware, firmware, software, and combinations thereof, that enable the functionality of resource volume adjustment sub-system 310 and the operability of resource volume adjustment sub-system 310 on the distributed computing network 110 (shown in FIG. 1). For example, processing subsystems allow for initiating and maintaining communications and exchanging data with other networked devices, such as resource interaction sub-system 200 and resource interaction database server 400 and object exchange database server 500 (shown in FIG. 3). For the disclosed aspects, processing subsystems of resource volume adjustment sub-system 310 may include any processing subsystem used in conjunction with the various sub-systems 310 and 210 of the system 100 and related tools, routines, sub-routines, algorithms, sub-algorithms, sub-modules thereof.

Resource volume adjustment sub-system 310 may additionally include a communications module (not shown in FIG. 5) embodied in hardware, firmware, software, and combinations thereof, that enables electronic communications between the resource volume adjustment sub-system 310 and other network devices, such as resource interaction sub-system 200 and resource interaction database server 400 and object exchange database server 500 (shown in FIG. 3). Thus, a communications module may include the requisite hardware, firmware, software and/or combinations thereof for establishing and maintaining a network communication connection with one or more network devices.

Resource volume adjustment sub-system 310 includes second instructions 320 that are configured to identify an object 242 in a resource interaction 230 as being subject to resource volume adjustment 330 based on a relationship formed between the object provider and a resource entity. Identification may be accomplished by accessing a resource interaction database and comparing the object provider and/or objects in resource interactions to a listing of object providers and/or objects that are subject to resource volume adjustment based on the predetermined relationship between the object provider and a resource entity.

In response to identifying the object, second instructions 320 are configured to monitor 340, for a first predetermined time period 342, a second resource volume 344 required by the object provider 240 to transmit the object 242. The first predetermined time period may include, but is not limited to, a week, a month, sixty days, ninety days or the like. In addition, in specific embodiments of the invention, in which the object and/or object provider 240 extends resource volume adjustment 330 to one or more other object provider(s) 244, second instructions 320 are configured to monitor 340, for a second predetermined time period 346, one or more third resource volume(s) 348 required by the other object provider(s) 244 to transmit the object 242. The second predetermined time period may be the same time period as the first predetermined time period or, in other instances, the second predetermined time period may differ from the first predetermined time period (e.g., the first predetermined time period may be sixty days and the second predetermined time period may be a week).

As a result of monitoring 340, the second instructions 320 are configured to determine 370 that the second resource volume 344 is less than the first resource volume 252 (i.e., the volume of resources used in the resource interaction 230) (350) and/or that the third resource volume 348 is less than the first resource volume 252 (352). In specific embodiments of the invention, the determination is based on predetermined threshold volume/percentage 372, such that the second resource volume 344 and/or third resource volume 348 is required to be less than the first resource volume 252 by the threshold volume or percentage 372 in order to trigger resource allocation. In other embodiments of the invention, the determination 370 is performed at the end of the first and/or second predetermined time periods 342, 346 such that the determination 370 results in the lowest second resource volume 344 and/or lowest third resource volume 348 experienced during the first and/or second predetermined time periods 342, 346. By limiting the determination to the end of the first and/or second predetermined time periods 342, 346 only one resource allocation is required (as opposed to the possibility of multiple resource allocations throughout the predetermined time period each time the second or third resource volume is lowered).

In response to determining that the second or third resource volume 344, 348 is less than the first resource volume 252 (350, 352), second instructions 320 are configured to allocate 360 resources 362 to the resource depository 262. The volume of resources 262 allocated to the resource depository 262 are associated with the difference between the second or third resource volume 344, 348 and the first resource volume 252. For example, the resource volume may be equal to the difference 364 between the second or third resource volume 344, 348 and the first resource volume 252, greater than the difference 366 between second or third resource volume 344, 348 and the first resource volume 252 or less than the difference 368 between second or third resource volume 344, 348 and the first resource volume 252 depending on the predetermined relationship between the object provider 240 and the resource entity 270. In additional embodiments of the invention, the resources 362 allocated 360 to the resource depository 262 may be provided by the object provider 240 or a combination of the object provider 240 and resource entity 270.

Figure 6:
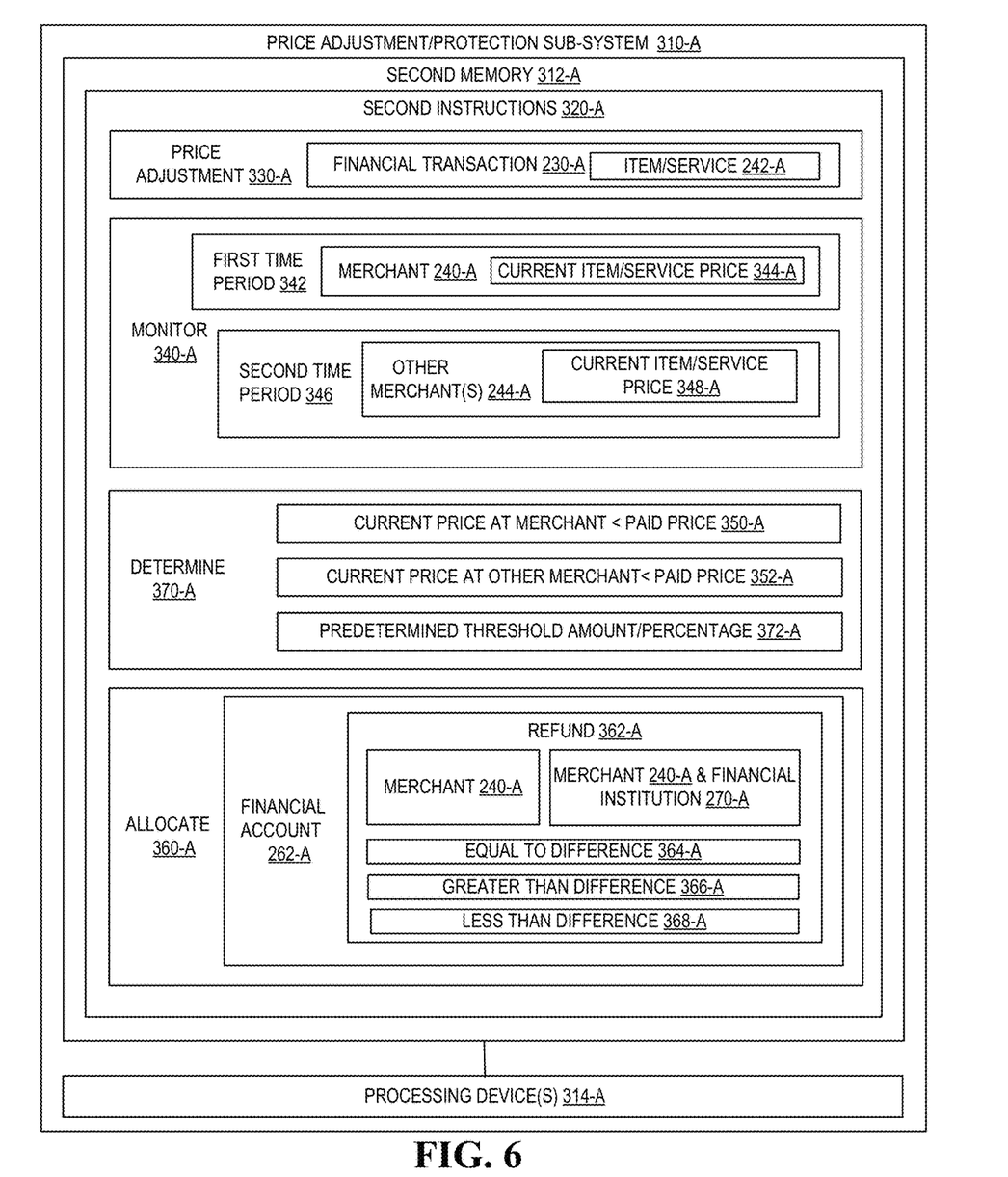
FIG. 6 is a block diagram of a price adjustment/protection sub-system, in accordance with embodiments of the present invention.

FIG. 6 depicts a block diagram of a price adjustment/protection sub-system 310-A, in accordance with various embodiments of the present invention. The price adjustment/protection sub-system 310-A may comprise one or typically more computing devices (e.g., servers, computing devices, or the like) and is configured to execute instructions, such as such as second instruction 320-A, algorithms, modules, routines, applications and the like. Price adjustment/protection sub-system 310-A includes second memory 312-A which may comprise volatile and non-volatile memory, such as read-only and/or random-access memory (RAM and ROM), EPROM, EEPROM, flash cards, or any memory common to computing platforms). Moreover, second memory 312-A may comprise cloud storage, such as provided by a cloud storage service and/or a cloud connection service.

Further, price adjustment/protection sub-system 310-A also includes at least one second processing device 314-A which may be an application-specific integrated circuit ("ASIC"), or other chipset, logic circuit, or other data processing device. Second processing device(s) 314-A may execute one or more application programming interface (APIs) (not shown in FIG. 6) that interface with any resident programs, such as second instructions 320-A or the like stored in the second memory 312-A of the price adjustment/protection sub-system 310-A and any external programs. Second processing devices 314-A, may include various processing subsystems (not shown in FIG. 6) embodied in hardware, firmware, software, and combinations thereof, that enable the functionality of price adjustment/protection sub-system 310-A and the operability of price adjustment/protection sub-system 310-A on the distributed computing network 110 (shown in FIG. 1). For example, processing subsystems allow for initiating and maintaining communications and exchanging data with other networked devices, such as financial transaction sub-system 200-A and merchant transaction database server 400-A and merchant pricing database server 5000-A (shown in FIG. 4). For the disclosed aspects, processing subsystems of price adjustment/protection sub-system 310-A may include any processing subsystem used in conjunction with the various sub-systems 310-A and 210-A of the system 100 and related tools, routines, sub-routines, algorithms, sub-algorithms, sub-modules thereof.

Price adjustment/protection sub-system 310 may additionally include a communications module (not shown in FIG. 6) embodied in hardware, firmware, software, and combinations thereof, that enables electronic communications between the price adjustment/protection sub-system 310-A and other network devices, such as financial transaction sub-system 200-A and merchant transaction database server 400-A and merchant pricing database server 500-A (shown in FIG. 4). Thus, communications module may include the requisite hardware, firmware, software and/or combinations thereof for establishing and maintaining a network communication connection with one or more network devices.

Price adjustment/protection sub-system 310-A includes second instructions 320-A that are configured to identify an item/service 242-A in a financial transaction 230-A as being subject to price adjustment/protection 330-A based on a relationship formed between the merchant and the financial institution. Identification may be accomplished by accessing a financial transaction database and comparing the merchant and/or items/services in financial transactions to a listing of merchants and/or items/services that are subject to price adjustment/protection based on the predetermined relationship between the merchant and the financial institution.

In response to identifying the item/service, second instructions 320-A are configured to monitor 340-A, for a first predetermined time period 342, a current item/service price 344-A required by the merchant 240-A to purchase the item/service 242-A. The first predetermined time period may include, but is not limited to, a week, a month, sixty days, ninety days or the like. In addition, in specific embodiments of the invention, in which the price protection of the item/service 242-A extends beyond the merchant 240-A to one or more other merchant(s) 244-A, second instructions 320-A are configured to monitor 340-A, for a second predetermined time period 346, one or more other current item/service price(s) 348-A required by the other merchant(s) 244-A to purchase the item/service 242-A. The second predetermined time period may be the same time period as the first predetermined time period or, in other instances, the second predetermined time period may differ from the first predetermined time period (e.g., the first predetermined time period may be sixty days and the second predetermined time period may be a week).

As a result of monitoring 340-A, the second instructions 320-A are configured to determine 370-A that the merchant's current item/service price 344-A is less than the purchase price 252-A (350) and/or that one of the other merchant's current item/service price 348-A is less than the purchase price 252-A (352). In specific embodiments of the invention, the determination is based on predetermined threshold volume/percentage 372-A, such that the current item/service price 344 or 348 is required to be less than the purchase price 252-A by the threshold amount or percentage 372-A in order to trigger a refund. In other embodiments of the invention, the determination 370 is performed at the end of the first and/or second predetermined time periods 342, 346 such that the determination 370 results in the lowest item/service price 344-A or 348-A experienced during the first and/or second predetermined time periods 342, 346. By limiting the determination to the end of the first and/or second predetermined time periods 342, 346 only one refund is required (as opposed to the possibility of multiple refunds throughout the predetermined time period each time the second or third item/service prices is lowered).

In response to determining that the second or third item/service price 344-A, 348-A is less than the purchase price 252-A (350-A, 352-A), second instructions 320-A are configured to allocate 360-A a refund 362=A to the financial payment account 262-A. The amount of the refund 262-A allocated to the financial account 262-A is associated with the difference between the second or third item/service prices 344-A, 348-A and the purchase price 252-A. For example, the amount of the refund 262-A may be equal to the difference 364 between the second or third item/service 344-A, 348-A and the purchase price 252-A, greater than the difference 366 between second or third item/price 344-A, 348-A and the purchase price 252-A or less than the difference 368 between second or third item/service price 344-A, 348-A and the purchase price 252-A depending on the predetermined relationship between the merchant 240-A and the financial institution 270-A. In additional embodiments of the invention, the refund 362-A allocated 360-A to the financial account 262-A may be provided solely by the merchant 240 or, in other embodiments of the invention, a combination of the merchant 240 and financial institution 270-A (e.g., merchant provides 90% of the refund and financial institution provides 10% of the refund).

Figure 7:
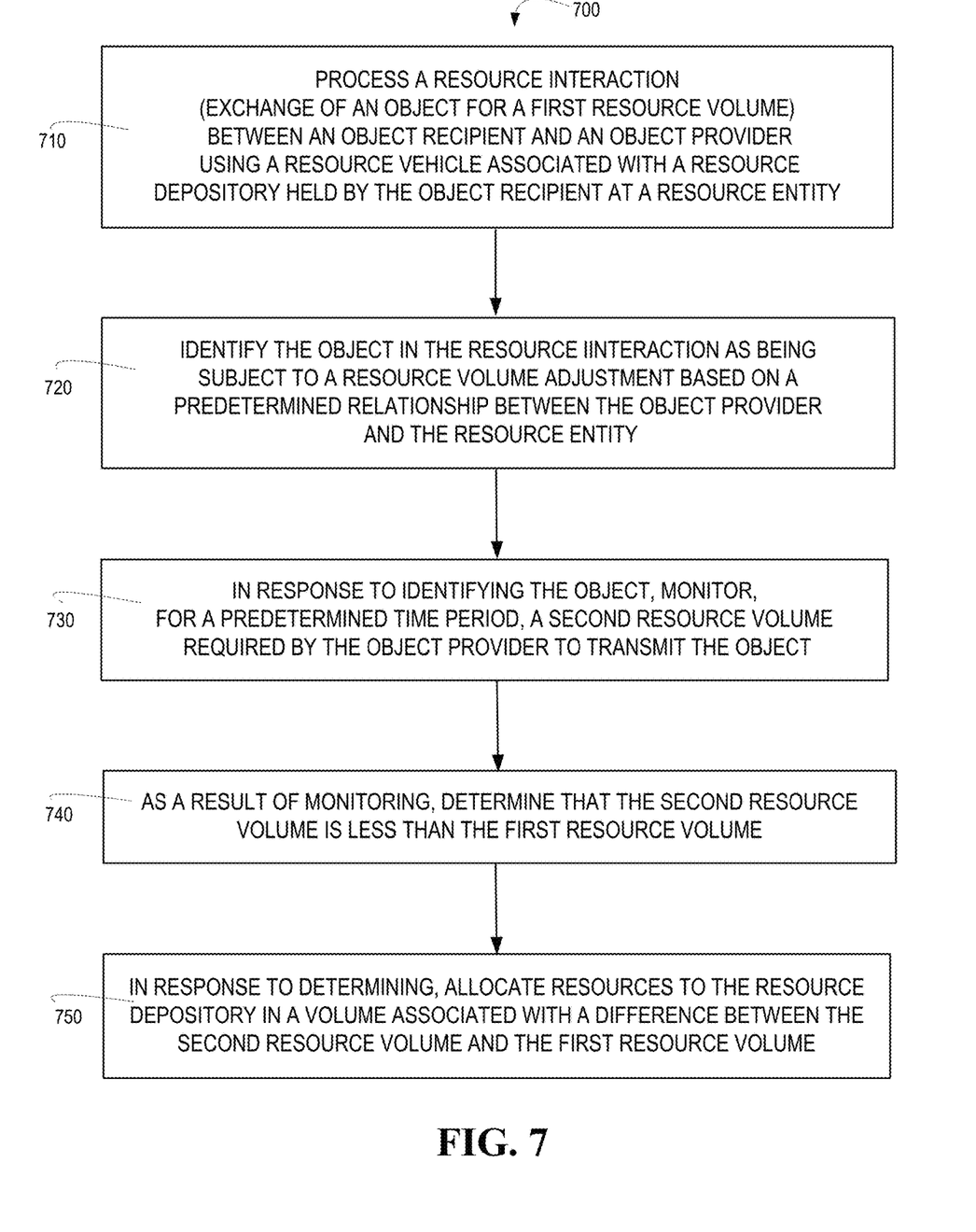
FIG. 7 is flow diagram of a method for resource allocation, in accordance with embodiments of the present invention.

Referring to FIG. 7, a flow diagram is presented of a method 700 for resource allocation, in accordance with embodiments of the present invention. At Event 710, a resource interaction (i.e., an exchange of an object for a first resource volume) is processed and information associated with the resource interaction is stored. The resource interaction is conducted between an object recipient and an object provider using a resource vehicle associated with a resource depository held by the object recipient at a resource entity.

At Event 720, the object in the resource interaction is identified as being subject to resource volume adjustment based on a predetermined relationship between the object provider and the resource entity. Identification may include accessing the stored information associated with the resource interaction to identify the object and determine that the object is one in which resource volume adjustment is applicable.

In response to identifying the object as being subject to resource volume adjustment, at Event 730, a second resource volume is monitored for a predetermined period of time. The second resource volume is the volume of resources currently required by the object provider to transmit the object. As a result of monitoring, at Event 740, a determination is made that the second resource volume is less than the first resource volume. The determination may be made at the end of the predetermined time period, such that, the determination reflects the greatest difference that occurred during the time period between the first resource volume and the second resource volume.

In response to determining that the second resource volume is less than the first resource volume, at Event 750, resources are allocated to the resource depository in a volume associated with the difference between the second resource volume and the first resource volume (e.g., equal to, less than or greater than the difference between the second resource volume and the first resource volume).

Figure 8:
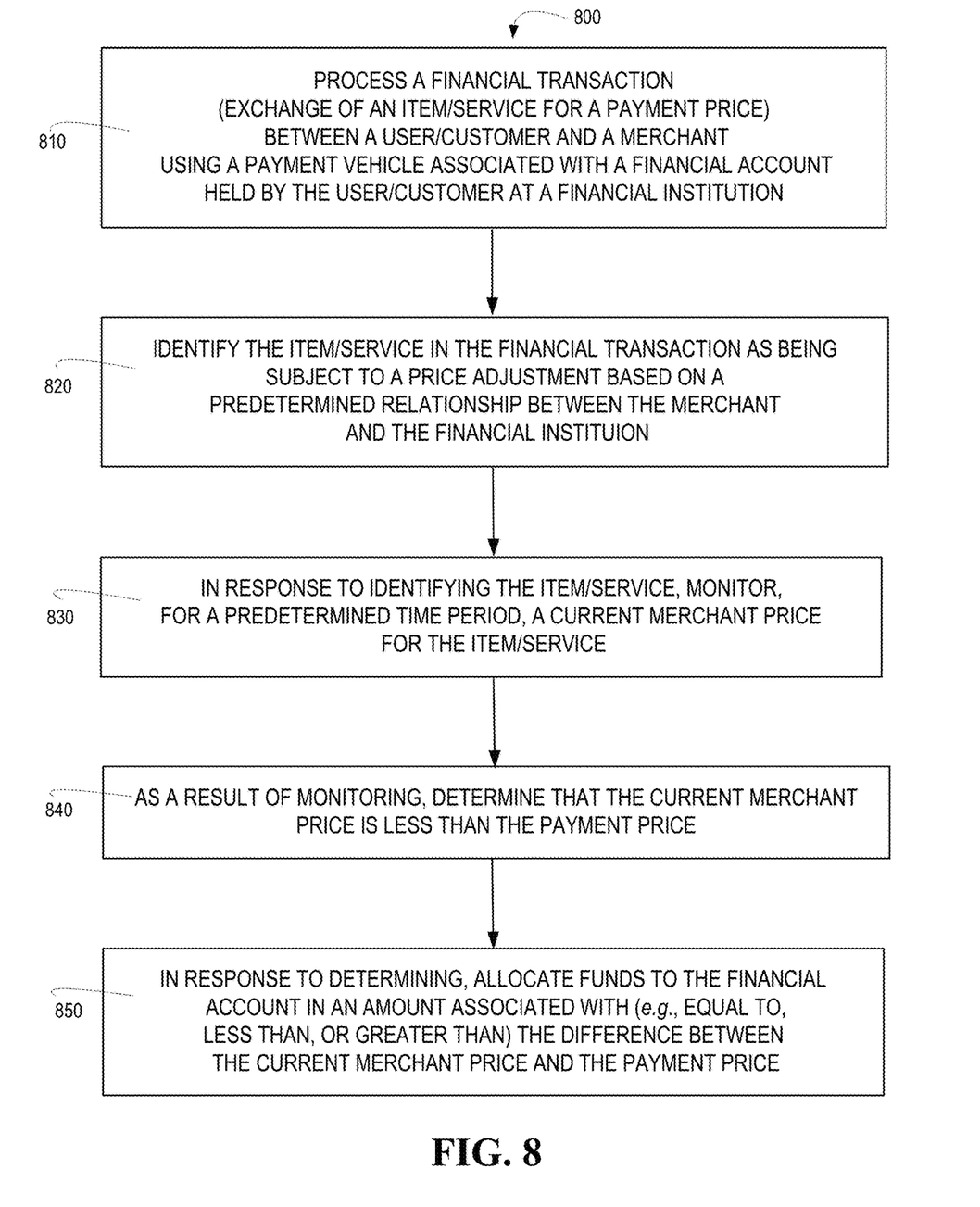
FIG. 8 is a flow diagram of a method for resource allocation; specifically, price adjustment/protection of a previously purchased item/service, in accordance with some embodiments of the present disclosure

Referring to FIG. 8, a flow diagram is presented of a method 800 for resource allocation, specifically price adjustment, in accordance with embodiments of the present invention. At Event 810, a financial transaction (i.e., an exchange of an item/service for a payment price) is processed and information associated with the financial transaction is stored. The financial transaction is conducted between a user/customer and a merchant using a payment vehicle associated with a financial account held by the user/customer at a financial institution.

At Event 820, the item/service in the financial institution is identified as being subject to price adjustment/protection based on a predetermined relationship between the merchant and the financial institution. Identification may include accessing the stored information associated with the financial interaction to identify the merchant and/or object and compare the merchant and/or object to a predetermined listing of merchants and/or objects that are approved for post-transaction price adjustment/protection in the event the prices decreases at the merchant during a prescribed post-transaction period of time.

In response to identifying the item/service as being subject to price adjustment/protection, at Event 830, the current merchant price is monitored for a predetermined period of time. The monitoring may include monitoring the merchant's transaction system/database to determine if the item/service has been purchased for a lower price than the purchase price during the predetermined period of time and/or monitoring the merchant's pricing system/database to determine the current merchant price. As a result of monitoring, at Event 840, a determination is made that the current merchant price is less than the purchase price. In addition, a determination may be made that the current merchant price is less than the purchase price by a prescribed amount or a prescribed percentage. The determination may be made at the end of the predetermined time period, such that, the determination reflects the greatest difference that occurred during the time period between the current merchant price and the purchase price. In such embodiments of the method, by making the determination at the end of the time period, it is possible to limit the number of times refunds are made to a single occurrence.

In response to determining that the current merchant price is less than the purchase price, at Event 850, a refund is automatically applied to the financial account in an amount associated with the difference between the current merchant price and the purchase price (e.g., equal to, less than or greater than the difference between the current merchant prices and the purchase price). As previously discussed, the entire purchase adjustment/protection process is designed to occur absent user/customer input or the performance of any other actions by or behalf of the user/customer.

Thus, present embodiments of the invention provide for an end-to-end automated process for resource allocation as a result of monitoring resource volumes required to transmit an object and determining a difference between the an object's resource volume used in a resource interaction and the current object's resource volume required to transmit the object. As a result, the present invention provides the capability to perform resource allocation absent any input or other actions on behalf of the entity to whom the resources are being allocated.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource allocation, the system comprising:
   a resource interaction sub-system including a first memory and one or more first computing processors in communication with the first memory, wherein the first memory stores first instructions that are executable by the one or more first computing processors and configured to:
      process a resource interaction between an object recipient and an object provider, wherein the resource interaction is performed using a resource vehicle associated with a resource depository held by the object recipient at a resource entity, and includes exchange of an object for a first resource volume; and
   a resource volume adjustment sub-system including a second memory and one or more second processors in communication with the second memory, wherein the second memory stores second instructions that are executable by the one or more second processors and configured to:
      identify the object in the resource interaction as being subject to a resource volume adjustment based on a predetermined relationship between the object provider and the resource entity,
      in response to identifying the object, monitor, for a first predetermined time period, a second resource volume required by the object provider to transmit the object,
      as a result of the monitoring, determine that the second resource volume is less than the first resource volume, and
      in response to determining, allocate resources to the resource depository in a volume associated with a difference between the second resource volume and the first resource volume.

2. The system of claim 1, wherein the allocating of resources occurs absent input from the object recipient.

3. The system of claim 1, further comprising:
   a resource interaction database associated with the object provider and configured to store data associated with resource interactions performed between the object providers and a plurality of object recipients, and
   wherein the second instructions are further configured to monitor the second resource volume by accessing the resource interaction database to determine the second resource volume from resource interactions occurring within the first predetermined time period.

4. The system of claim 1, further comprising:
   an object exchange database associated with the object provider and configured to store current resource volume information required for transmitting objects provider by the object provider, and wherein the second instructions are further configured to monitor the second resource volume by accessing the object exchange database to determine the second resource volume based on the current resource volume required for transmitting the object.

5. The system of claim 1, wherein the second instructions are further configured to allocate resources to the resource depository in the volume equal to the difference between the second resource volume and the first resource volume.

6. The system of claim 1, wherein the second instructions are further configured to allocate resources to the resource depository in the volume less than or greater than the difference between the second resource volume and the first resource volume.

7. The system of claim 1, wherein the second instructions are further configured to:
monitor, for a second predetermined period of time, a third resource volume required by one or more other object providers to transmit the object,
as a result of the monitoring, determine that either the second resource volume or the third resource volume is less than the first resource volume;
in response to determining, allocate resources to the resource depository in a volume associated with a difference between the second resource volume or the third resource volume and the first resource volume.

8. The system of claim 1, wherein the second instructions are further configured to determine that the difference between the second resource volume and the first resource volume exceeds a predetermined threshold volume or percentage prior to allocating the resources.

9. The system of claim 1, wherein the second instructions are further configured to allocate the resources to the resource depository, wherein the resources are provided by the object provider.

10. The system of claim 1, wherein the second instructions are further configured to allocate the resources to the resource depository, wherein the resources are provided by object provider and the resource entity.

11. A computer program product for resource allocation, the computer program product comprising at least one non-transitory computer readable medium comprises computer readable instructions for:
processing a resource interaction between an object recipient and an object provider, wherein the resource interaction is performed using a resource vehicle associated with a resource depository held by the object recipient at a resource entity, and includes exchange of an object for a first resource volume;
identifying the object in the resource interaction as being subject to a resource volume adjustment based on a predetermined relationship between the object provider and the resource entity,
in response to identifying the object, monitoring, for a first predetermined time period, a second resource volume required by the object provider to transmit the object,
as a result of the monitoring, determining that the second resource volume is less than the first resource volume, and
in response to determining, allocating resources to the resource depository in a volume associated with a difference between the second resource volume and the first resource volume.

12. The computer program product of claim 11, wherein the computer readable instructions for monitoring further comprises computer readable instructions for monitoring the second resource volume by accessing a resource interaction database to determine the second resource volume from resource interactions occurring within the first predetermined time period.

13. The computer program product of claim 11, wherein the computer readable instructions for monitoring further comprises computer readable instructions for monitoring the second resource volume by accessing an object exchange database to determine the second resource volume based on the current resource volume required for transmitting the object.

14. The computer program product of claim 11, wherein the computer readable instructions allocating resources further comprise computer readable instructions for allocating resources to the resource depository in the volume equal to the difference between the second resource volume and the first resource volume.

15. The computer program product of claim 11, wherein the computer readable instructions allocating resources further comprise computer readable instructions for allocating resources to the resource depository in the volume less than or greater than the difference between the second resource volume and the first resource volume.

16. A computer-implemented method for resource allocation, the method is executed by one or more computing processor devices and comprises:
processing a resource interaction between an object recipient and an object provider, wherein the resource interaction is performed using a resource vehicle associated with a resource depository held by the object recipient at a resource entity, and includes exchange of an object for a first resource volume;
identifying the object in the resource interaction as being subject to a resource volume adjustment based on a predetermined relationship between the object provider and the resource entity,
in response to identifying the object, monitoring, for a first predetermined time period, a second resource volume required by the object provider to transmit the object,
as a result of the monitoring, determining that the second resource volume is less than the first resource volume, and
in response to determining, allocating resources to the resource depository in a volume associated with a difference between the second resource volume and the first resource volume.

17. The computer-implemented method of claim 16, wherein monitoring further comprises monitoring the second resource volume by accessing a resource interaction database to determine the second resource volume from resource interactions occurring within the first predetermined time period.

18. The computer-implemented method of claim 16, wherein monitoring further comprises monitoring the second resource volume by accessing an object exchange database to determine the second resource volume based on the current resource volume required for transmitting the object.

19. The computer-implemented method of claim 16, wherein allocating resources further comprises allocating resources to the resource depository in the volume equal to the difference between the second resource volume and the first resource volume.

20. The computer-implemented method of claim 16, wherein allocating resources further comprises allocating resources to the resource depository in the volume less than or greater than the difference between the second resource volume and the first resource volume.

\* \* \* \* \*